Oct. 22, 1929.  H. E. LENNON  1,732,941
TURF CUTTER
Filed Oct. 10, 1927
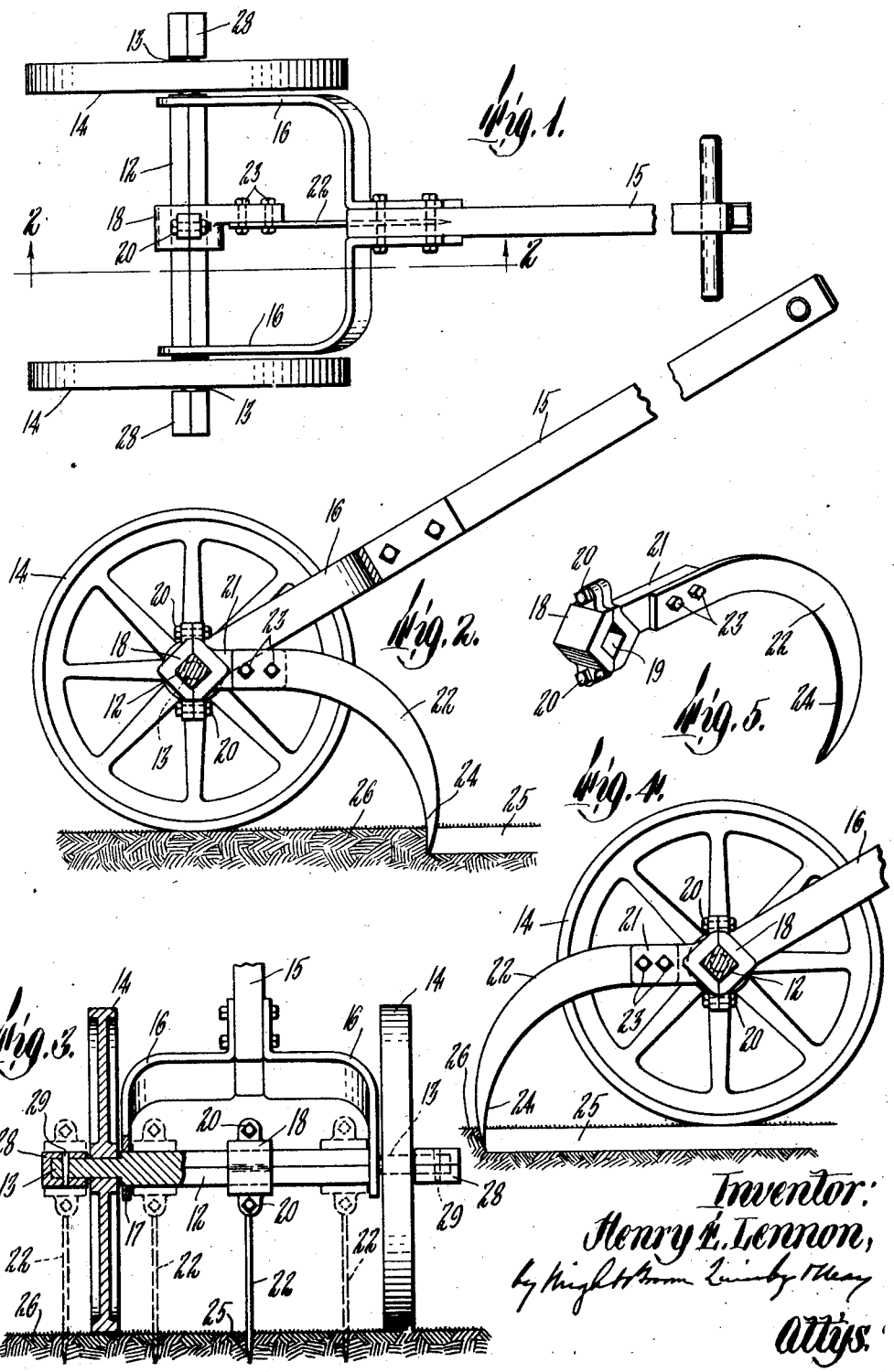
Inventor:
Henry E. Lennon,
by Knight Brown Quinby Meany
Attys.

Patented Oct. 22, 1929

1,732,941

UNITED STATES PATENT OFFICE

HENRY E. LENNON, OF MILFORD, NEW HAMPSHIRE

TURF CUTTER

Application filed October 10, 1927. Serial No. 225,092.

The object of this invention is to provide a cutter adapted particularly to cut turf at the edges of walks and elsewhere, and to be conveniently and accurately operated.

Of the accompanying drawings forming a part of this specification,—

Figure 1 is a top plan view of a turf cutter embodying the invention.

Figure 2 is a section on line 2—2 of Figure 1.

Figure 3 is a front elevation, portions being shown in section.

Figure 4 is a view similar to Figure 2, showing a different arrangement.

Figure 5 is a perspective view of the holder and cutting blade shown by the preceding figures.

The same reference characters indicate the same parts in all of the figures.

The axle of my improved turf cutter includes a polygonal body 12 and cylindrical axle arms 13 at its opposite end on which traction wheels 14 are journaled, the same being in alinement with the body.

15 designates a handle having forks 16, fixed to the axle body, each fork 18 having a polygonal orifice 17 (Figure 3) closely fitting the polygonal body.

18 designates a holder, also fixed to the body 12. The holder includes two jaws collectively forming a compressible polygonal socket 19 (Figure 5), closely fitting the polygonal axle body, the jaws being separably connected by clamping bolts 20. One of the jaws is provided with an arm 21.

22 designates a cutting blade fixed at one end to the holder, as by bolts 23, engaging the arm 21. The cutting edge 24 of the blade is arranged in a vertical plane and projects downwardly from the holder and axle and is adapted to project below the lowest portions of the wheels 14, so that it is adapted to cut a slit 25 in turf 26. The blade 22 is inclined and projects laterally from the axle, so that it may be raised and lowered by the handle with which the axle body 12 is rigidly connected by the means described. The depth of the slit 25 may, therefore, be varied, by varying the inclination of the handle. The described construction of the blade holder permits it to be adjusted lengthwise of the axle, as indicated by full and dotted lines in Figure 3.

If desired, polygonal end pieces or caps 28 may be fixed, as by pins 29 (Figure 3), to the outer ends of the axle arms 13, so that the holder and cutting blade may be located at the outer side of either wheel. The cutting blade may project from the same side of the axle as the handle, as shown by Figures 1 and 2, or from the opposite side, as shown by Figure 4.

I claim:

1. A turf cutter comprising an axle including a polygonal body and cylindrical axle arms at opposite ends of the body and in alinement therewith, traction wheels journaled on said arms, a blade holder including a polygonal clamp adapted to be expanded, adjusted lengthwise of the body and compressed thereon to maintain the adjustment, and an arm projecting from said clamp, a flat-sided cutting blade fixed to the holder arm, and maintained by the holder with the flat sides of the blade in a plane at right angles with the axle, the blade being arranged to project downwardly and laterally from the holder and axle and below the lowest portions of the wheels, so that it is adapted to cut a vertical slit in turf supporting the wheels, and a handle fixed to the polygonal body and adapted to turn the axle arms in the wheel hubs to raise and lower the blade.

2. A turf cutter as specified by claim 1, comprising also polygonal end caps fixed to the cylindrical arms at the outer sides of the wheels and constituting extensions of the polygonal body adapted to be engaged by the blade-holder clamp, so that the blade may be located at the outer side of either wheel.

In testimony whereof I have affixed my signature.

(REV.) HENRY E. LENNON.